US012251948B2

(12) United States Patent
Endo

(10) Patent No.: US 12,251,948 B2
(45) Date of Patent: Mar. 18, 2025

(54) PRINTING APPARATUS AND METHOD OF CONTROLLING DRIVING OF PRINTING APPARATUS

(71) Applicant: SEIKO EPSON CORPORATION, Tokyo (JP)

(72) Inventor: Hiroyuki Endo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/156,830

(22) Filed: Jan. 19, 2023

(65) Prior Publication Data

US 2023/0226826 A1 Jul. 20, 2023

(30) Foreign Application Priority Data

Jan. 20, 2022 (JP) ................................. 2022-007143

(51) Int. Cl.

| | |
|---|---|
| ***B41J 3/407*** | (2006.01) |
| ***B65C 9/00*** | (2006.01) |
| *B65C 9/18* | (2006.01) |
| *B65C 9/46* | (2006.01) |

(52) U.S. Cl.

CPC ........... *B41J 3/4075* (2013.01); *B65C 9/0006* (2013.01); *B65C 2009/0009* (2013.01); *B65C 9/1876* (2013.01); *B65C 9/46* (2013.01)

(58) Field of Classification Search

CPC ........ B41J 3/4075; B65C 9/1876; B65C 9/46; B65C 2009/0009; B65C 9/0006; B65C 20/02

See application file for complete search history.

(56) References Cited

U.S. PATENT DOCUMENTS 11,173,725 B2 * 11/2021 Takami ................. B65C 9/0006
11,267,670 B2 3/2022 Takami

FOREIGN PATENT DOCUMENTS

JP 2021-28117 A 2/2021

* cited by examiner

*Primary Examiner* — Geoffrey S Mruk
(74) *Attorney, Agent, or Firm* — WORKMAN NYDEGGER

(57) ABSTRACT

Included are a first roller disposed upstream of a peeling unit, a second roller disposed downstream of the peeling unit, a first motor configured to drive the first roller, a second motor configured to drive the second roller, and a control unit. The control unit includes a first-motor control unit configured to adjust a first voltage applied to the first motor on the basis of information about a transport velocity and a transport acceleration of the label sheet, such that a load torque of the first motor is a target torque, and also includes a second-motor control unit configured to perform feedback control of a second voltage applied to the second motor on the basis of information about a transport velocity of a base sheet, such that the transport velocity of the base sheet is a target transport velocity.

6 Claims, 6 Drawing Sheets

PRINTING APPARATUS AND METHOD OF CONTROLLING DRIVING OF PRINTING APPARATUS

The present application is based on, and claims priority from JP Application Serial Number 2022-007143, filed on Jan. 20, 2022, the disclosure of which is hereby incorporated by reference herein in its entirety.

BACKGROUND

1. Technical Field

The present disclosure relates to a printing apparatus and a method of controlling driving of a printing apparatus.

2. Related Art

A printer including a label peeling mechanism is known. For example, a label printer described in JP-A-2021-28117 includes a printing head configured to perform printing on a label sheet, a transport roller disposed upstream of the printing head in a transport path of the label sheet and configured to transport the label sheet downstream, a peeling roller disposed downstream of the printing head and configured to transport a base sheet in a direction differing from an advancing direction of a label to peel the label from the base sheet, and a control unit configured to control rotation of the transport roller and rotation of the peeling roller. The control unit controls an electric current value supplied to a peeling motor that causes the peeling roller to rotate, in a manner such that transportation force with which the peeling roller transports the base sheet is equal to or more than the minimum force necessary to peel the label and is also more than the maximum frictional force between the peeling roller and the base sheet. In addition, the maximum frictional force described above and the maximum frictional force between the transport roller and the label sheet are set such that the maximum frictional force between the peeling roller and the base sheet is equal to or less than transport force of the peeling roller with which an error occurring in transporting the label sheet by the transport roller is equal to or less than an allowable value.

However, the label printer described in JP-A-2021-28117 controls the tension of the base sheet using a frictional force between the peeling roller and the base sheet. Thus, the tension of the base sheet depends on the friction coefficient, a wrap angle, and a clamp force, and is difficult to be stabilized. When the tension of the base sheet is not stabilized, peeling failure occurs due to a reduction in the tension, or poor accuracy of paper feed occurs due to an increase in the tension, or the like.

SUMMARY

A printing apparatus according to one aspect of the present embodiment includes a printing head configured to perform printing on a label sheet obtained by attaching a label to a base sheet, a peeling unit configured to peel the label from the base sheet, a first roller disposed upstream of the peeling unit in a transport path of the label sheet, a second roller disposed downstream of the peeling unit in a transport path of the base sheet, a first driving unit configured to drive the first roller, a second driving unit configured to drive the second roller, and a control unit configured to control the first driving unit and the second driving unit, in which the control unit adjusts a voltage applied to the first driving unit on a basis of information about a transport velocity and a transport acceleration of the label sheet, such that a load torque of the first driving unit is a predetermined value, and the control unit performs feedback control of a voltage applied to the second driving unit on a basis of information about a transport velocity of the base sheet, such that the transport velocity of the base sheet is a predetermined velocity.

A method of controlling driving of a printing apparatus according to another aspect of the present embodiment is provided, the printing apparatus including a printing head configured to perform printing on a label sheet obtained by attaching a label to a base sheet, a peeling unit configured to peel the label from the base sheet, a first roller disposed upstream of the peeling unit in a transport path of the label sheet, a second roller disposed downstream of the peeling unit in a transport path of the base sheet, a first driving unit configured to drive the first roller, a second driving unit configured to drive the second roller, and a control unit configured to control the first driving unit and the second driving unit, the method including a first step including adjusting, by the control unit, a voltage applied to the first driving unit on a basis of information about a transport velocity and a transport acceleration of the label sheet such that a load torque of the first driving unit is a predetermined value, and a second step including performing, by the control unit, feedback control of a voltage applied to the second driving unit on a basis of information about a transport velocity of the base sheet, such that the transport velocity of the base sheet is a predetermined velocity.

DESCRIPTION OF EXEMPLARY EMBODIMENTS

Below, the present embodiment will be described with reference to the drawings.

Figure 1:
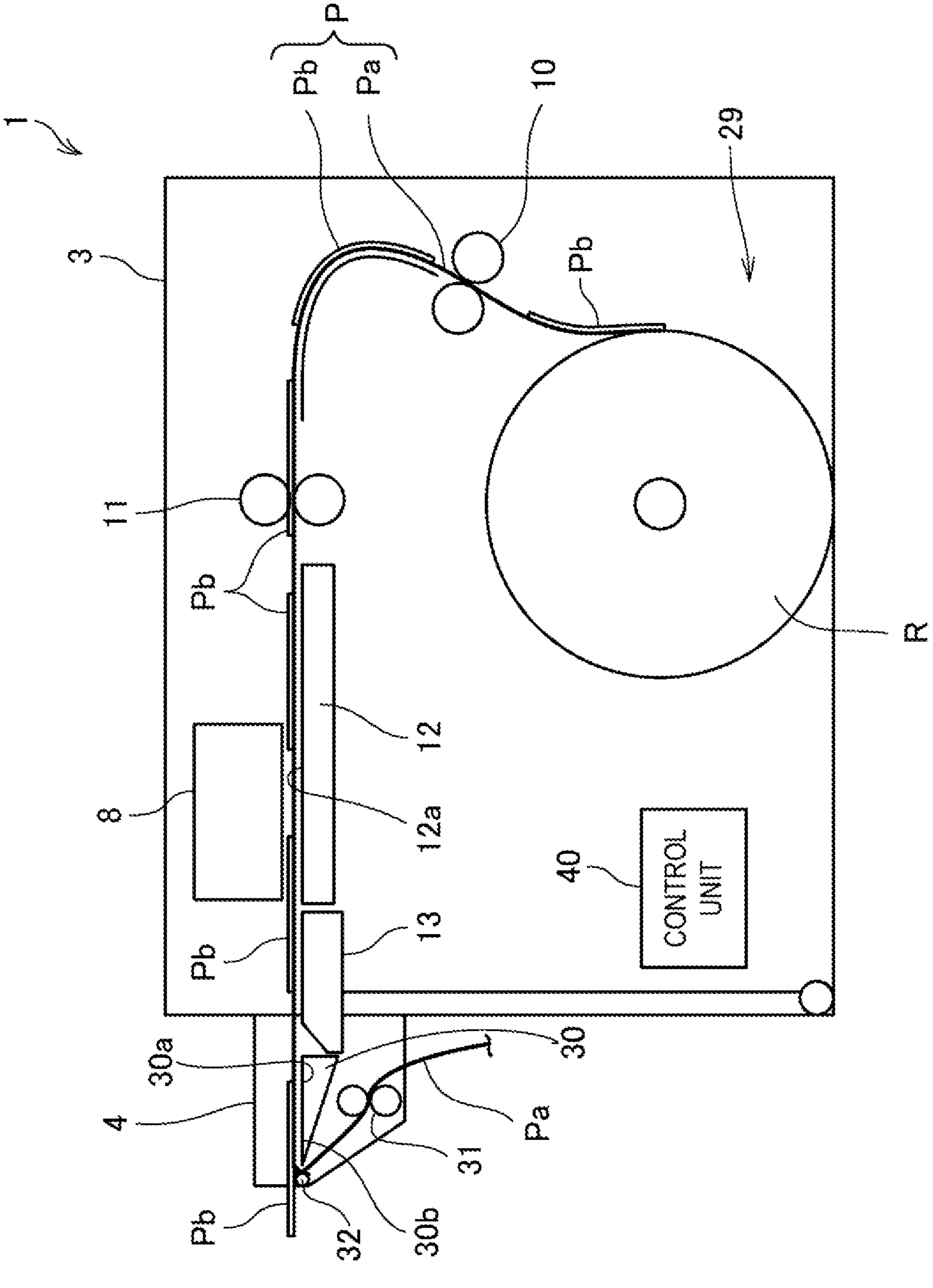
FIG. 1 is a diagram illustrating one example of the entire configuration of a label printer according to the present embodiment.

FIG. 1 is a diagram illustrating one example of the entire configuration of a label printer 1 according to the present embodiment.

The label printer 1 is, for example, a printer of an ink jet type configured to perform printing of characters, images, diagrams, or the like using a label sheet P as a printing medium.

The label printer 1 corresponds to one example of a "printing apparatus".

The label sheet P includes a base sheet Pa and a plurality of labels Pb. The base sheet Pa is a band-shaped continuous sheet. The front surface of the base sheet Pa has a peeling property, and the labels Pb each cut into a predetermined size are affixed at equal intervals in the longitudinal direction of the base sheet Pa. The materials of the base sheet Pa and the labels Pb may be paper, or may be a material other than paper. The label sheet P is mounted at the label printer 1 as roll paper R wound in a roll form.

The label printer 1 includes a printing unit 3 serving as a main body of the label printer 1, and a peeling unit 4. The peeling unit 4 may be formed integrally with the printing unit 3 or may be a component detachable from the printing unit 3.

The peeling unit 4 is a device configured such that a process of peeling the labels Pb from the base sheet Pa is performed to the label sheet P on which printing has been performed by the printing unit 3, and hence, is called a peeler. The label printer 1 is able to perform a non-peeling mode for ejecting a label sheet P in which the label Pb is still attached on the base sheet Pa after printing has been performed, and also able to perform a peeling mode for ejecting a label Pb that has been peeled from the base sheet Pa after printing has been performed. In the present embodiment, the peeling mode will be described.

The printing unit 3 uses a printing head 8 to perform printing to each of the labels Pb of the label sheet P on the basis of a command and print data transmitted from a not-illustrated computer. In addition, the printing unit 3 transports the label sheet P along a transport path of the label sheet P. Below, the upstream and the downstream in the transport path may be simply referred to as "upstream" and "downstream", respectively.

As illustrated in FIG. 1, the printing unit 3 includes an accommodation portion 29, a delivering roller 10, a first roller 11, a platen 12, a guide 13, the printing head 8, and a control unit 40.

The accommodation portion 29 is a space used to accommodate the roll paper R, and the label sheet P is delivered from the roll paper R mounted at the accommodation portion 29. The delivering roller 10 is comprised of a pair of rollers disposed so as to be opposed to each other, and is configured to transport downstream the label sheet P delivered from the roll paper R.

The first roller 11 is comprised of a pair of rollers disposed so as to be opposed to each other, and is configured to interpose the label sheet P transported by the delivering roller 10 to transport it downstream toward the printing head 8.

The delivering roller 10 is coupled to a feed motor that is not illustrated, and rotates with power of the feed motor. The first roller 11 is coupled directly to the first motor M1 or through a gear, a belt, or the like, and rotates with power of the first motor M1.

The first motor M1 corresponds to one example of a "first driving unit".

The first roller 11 and the first motor M1 will be described in more detail with reference to FIGS. 2 and 3.

The platen 12 is disposed downstream of the first roller 11 in the transport path of the label sheet P. A platen surface 12*a* that is an upper surface of the platen 12 is brought into contact with the base sheet Pa of the label sheet P to support the label sheet P from below. The platen surface 12*a* includes a plurality of suction holes (not illustrated). Each of the suction holes communicates with a suction fan that is not illustrated. With the suction fan operating, air is suctioned from the suction holes to suck the label sheet P at the platen surface 12*a*.

The printing head 8 is disposed so as to be opposed to the platen surface 12*a*. The printing head 8 includes nozzle rows, which are not illustrated, each corresponding to ink of one or a plurality of colors, and discharges ink from nozzles that constitute each of the nozzle rows. The printing head 8 discharges ink to the label Pb disposed on the platen surface 12*a* on the basis of the print data to perform printing on the label Pb. The label sheet P on which printing has been performed by the printing head 8 is transported, by the first roller 11, to the peeling unit 4 at the downstream side.

The present embodiment describes a case in which the label printer 1 is of ink jet type to perform printing on the label Pb. However, the type thereof is not limited to the ink jet type.

The guide 13 is disposed downstream of the printing head 8. Between the platen 12 and the peeling unit 4, the guide 13 supports, from below, the label sheet P on which printing has been performed by the printing head 8. The label sheet P passes above the guide 13, and is transported toward the peeling unit 4 downstream.

The peeling unit 4 includes a peeling member 30 and a second roller 31. The peeling member 30 is disposed downstream of the guide 13 of the printing unit 3. The peeling member 30 includes a guide surface 30*a* that is brought into contact with the base sheet Pa of the label sheet P to support the label sheet P from below, and a peeling edge 30*b* formed at the top end of the guide surface 30*a* and having an acute angle. The label sheet P guided by the guide 13 is transported to above the guide surface 30*a* of the peeling member 30.

The second roller 31 is comprised of a pair of rollers disposed so as to be opposed to each other, and is configured to interpose the base sheet Pa to transport it. The second roller 31 is coupled directly to the second motor M2 or through a gear, a belt, or the like, and rotates with power of the second motor M2.

The second motor M2 corresponds to one example of a "second driving unit".

The second roller 31 and the second motor M2 will be described in more detail with reference to FIGS. 2 and 3.

When the label printer 1 is operated in the peeling mode, a user performs an operation of interposing the base sheet Pa of the label sheet P at the second roller 31 before the start of printing. The second roller 31 is disposed at a position lower than the peeling member 30, and interposes the base sheet Pa to transport it with the base sheet facing downward. The base sheet Pa of the label sheet P that is transported through the guide surface 30*a* is bent at the peeling edge 30*b*, and is pulled downward by the second roller 31. With this pulling force by the second roller 31, the label Pb is lifted from the base sheet Pa at the peeling edge 30*b*, and is peeled off. The peeled label Pb protrudes toward the left direction from the peeling unit 4 in FIG. 1. The label Pb protruding from the peeling unit 4 is collected by the user. On the other hand, the base sheet Pa transported by the second roller 31 toward a direction differing from that of the label Pb is ejected downward of the second roller 31.

In the configuration described above, the delivering roller 10, the first roller 11, the platen 12, the guide 13, and the guide surface 30*a* of the peeling member 30 constitutes the transport path of the label sheet P in the printing unit 3. In addition, the peeling edge 30*b* and the second roller 31 constitutes a portion of the transport path of the base sheet Pa.

The control unit 40 controls operations of each component that constitutes the label printer 1. In the present embodiment, the control unit 40 controls driving of the first roller 11 and the second roller 31. That is, the control unit 40 controls the first motor M1 and the second motor M2.

The control unit 40 will be described in more detail with reference to FIGS. 2 and 3.

Next, a method of driving the first roller 11 and a method of driving the second roller 31 will be described with reference to FIGS. 2 and 3.

Figure 2:
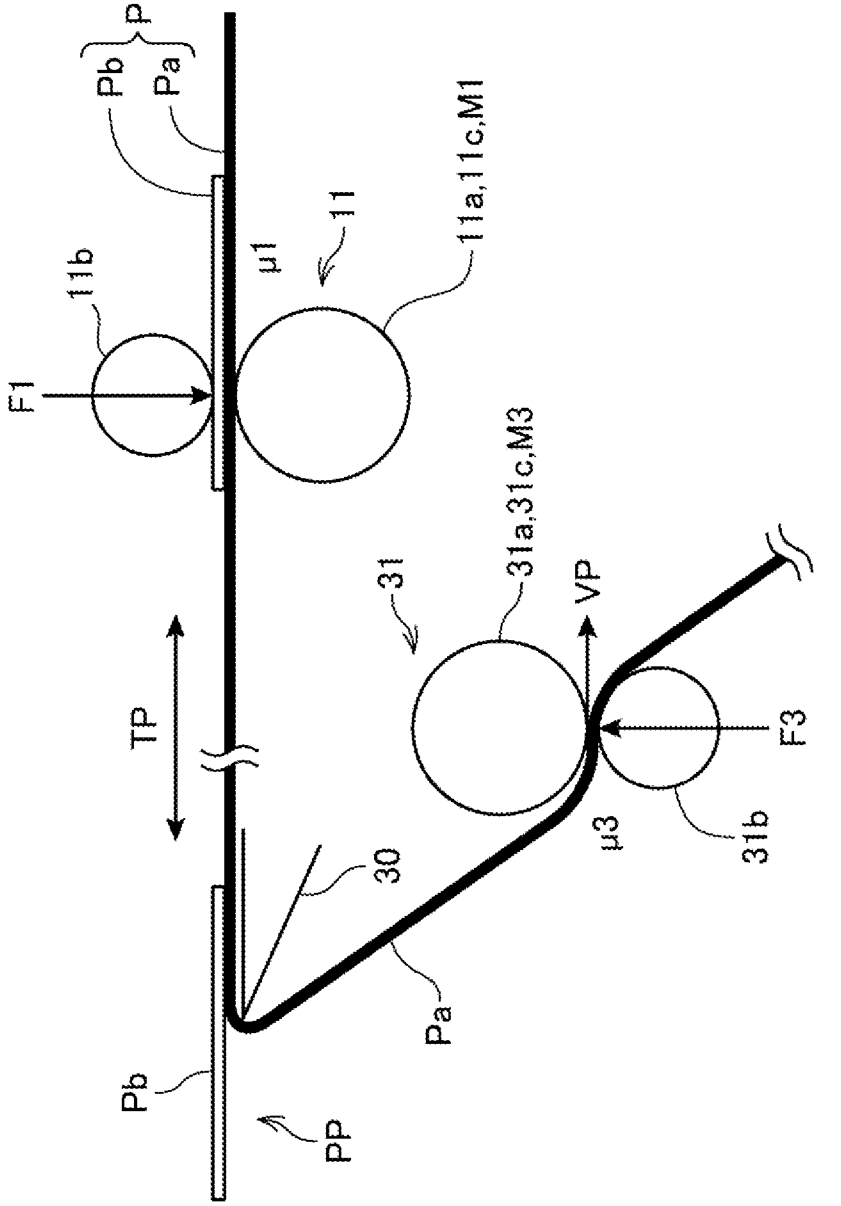
FIG. 2 is a diagram illustrating one example of a configuration of main components of the label printer.

FIG. 2 is a diagram illustrating one example of the configuration of the main components of the label printer 1. FIG. 3 is a diagram illustrating one example of the configuration of the control unit 40.

As illustrated in FIG. 2, the first roller 11 includes a first driving roller 11*a* and a first driven roller 11*b*, and the label sheet P is interposed between them. The first motor M1 rotationally drives the first driving roller 11*a*. The first driven roller 11*b* is supported so as to be able to rotate in association with transportation of the label sheet P due to rotation of the first driving roller 11*a*.

The second roller 31 includes a second driving roller 31*a* and a second driven roller 31*b*, and the base sheet Pa of the label sheet P is interposed between them. The second motor M2 rotationally drives the second driving roller 31*a*. The second driven roller 31*b* is supported so as to be able to rotate in association with transportation of the base sheet Pa due to rotation of the second driving roller 31*a*.

At the first roller 11, the first driven roller 11*b* presses the first driving roller 11*a* with force F1 in order to interpose the label sheet P. In other words, the first driving roller 11*a* is pressed with the force F1 in a direction substantially perpendicular to the direction of the label sheet P at a contact point with the label sheet P.

The front surface of the first driving roller 11*a* is formed by thermal spraying or subjected to powder coating. In this case, a friction coefficient μ1 between the first driving roller 11*a* and the label sheet P is a value large enough for the label sheet P not to slip relative to the front surface of the first driving roller 11*a*. The front surface of the first driven roller 11*b* is made, for example, of rubber.

Tension TP is tension applied to the label sheet P between the first roller 11 and the second roller 31. The tension TP satisfies the following Relationship (1).

$$TP<\mu 1\times F1 \quad (1)$$

The control unit 40 controls driving of the first motor M1 to control the tension TP. For example, the control unit 40 controls the generated torque TE1 generated by the first motor M1 such that the tension TP is equal to a tension target value TT.

The present embodiment describes a case in which the tension target value TT is a constant value. In this case, the control unit 40 controls a load torque TL1 applied from the label sheet P to the first roller 11, so as to be equal to a target torque TS corresponding to the tension target value TT. That is, the control unit 40 controls the generated torque TE1 generated by the first motor M1 such that the load torque TL1 is the target torque TS that is a constant value.

Note that the tension target value TT is set to a value that does not cause the label sheet P to loosen or bend between the first roller 11 and the second roller 31.

The process of the control unit 40 will be described in more detail with reference to FIG. 3.

At the second roller 31, the second driven roller 31*b* presses the second driving roller 31*a* with force F3 in order to interpose the base sheet Pa. In other words, the second driving roller 31*a* is pressed by the second driven roller 31*b* with the force F3 in a direction substantially perpendicular to the advancing direction of the base sheet Pa at a contact point with the base sheet Pa. A friction coefficient p3 is a friction coefficient between the second driving roller 31*a* and the base sheet Pa.

The front surface of the second driving roller 31*a* is formed by thermal spraying or subjected to powder coating. In this case, a friction coefficient p3 between the second driving roller 31*a* and the base sheet Pa is a value large enough for the base sheet Pa not to slip relative to the front surface of the second driving roller 31*a*. The front surface of the second driven roller 31*b* is made, for example, of rubber.

The tension TP is tension applied to the base sheet Pa between the first roller 11 and the second roller 31. The tension TP satisfies the following Relationship (2).

$$TP<\mu 3\times F3 \quad (2)$$

The control unit 40 controls driving of the second motor M2 such that a transport velocity VP of the base sheet Pa is equal to a target transport velocity VT. The target transport velocity VT varies, for example, in a substantially trapezoid shape, and the target transport velocity VT corresponding to a rotational angle φ of the second driving roller 31*a* is stored in a table.

For example, the target transport velocity VT is set to zero during a time when the printing head 8 performs printing on the label sheet P, and during a period of time from a time when the label Pb reaches a peeling position PP where the label Pb protrudes from the peeling unit 4 to a time when the label Pb is collected by a user.

In addition, after printing to the label sheet P finishes, the target transport velocity VT is set so as to accelerate at a constant acceleration, keep a constant velocity, and decelerate at a constant acceleration. Thus, driving of the second motor M2 is controlled such that the transport velocity VP accelerates at a constant acceleration, is maintained at a constant velocity, and decelerates at a constant acceleration, thereby causing the label Pb to be transported to the peeling position PP.

The target transport velocity VT corresponds to one example of a "predetermined velocity".

Next, the configuration of the control unit 40 will be described with reference to FIG. 3.

Figure 3:
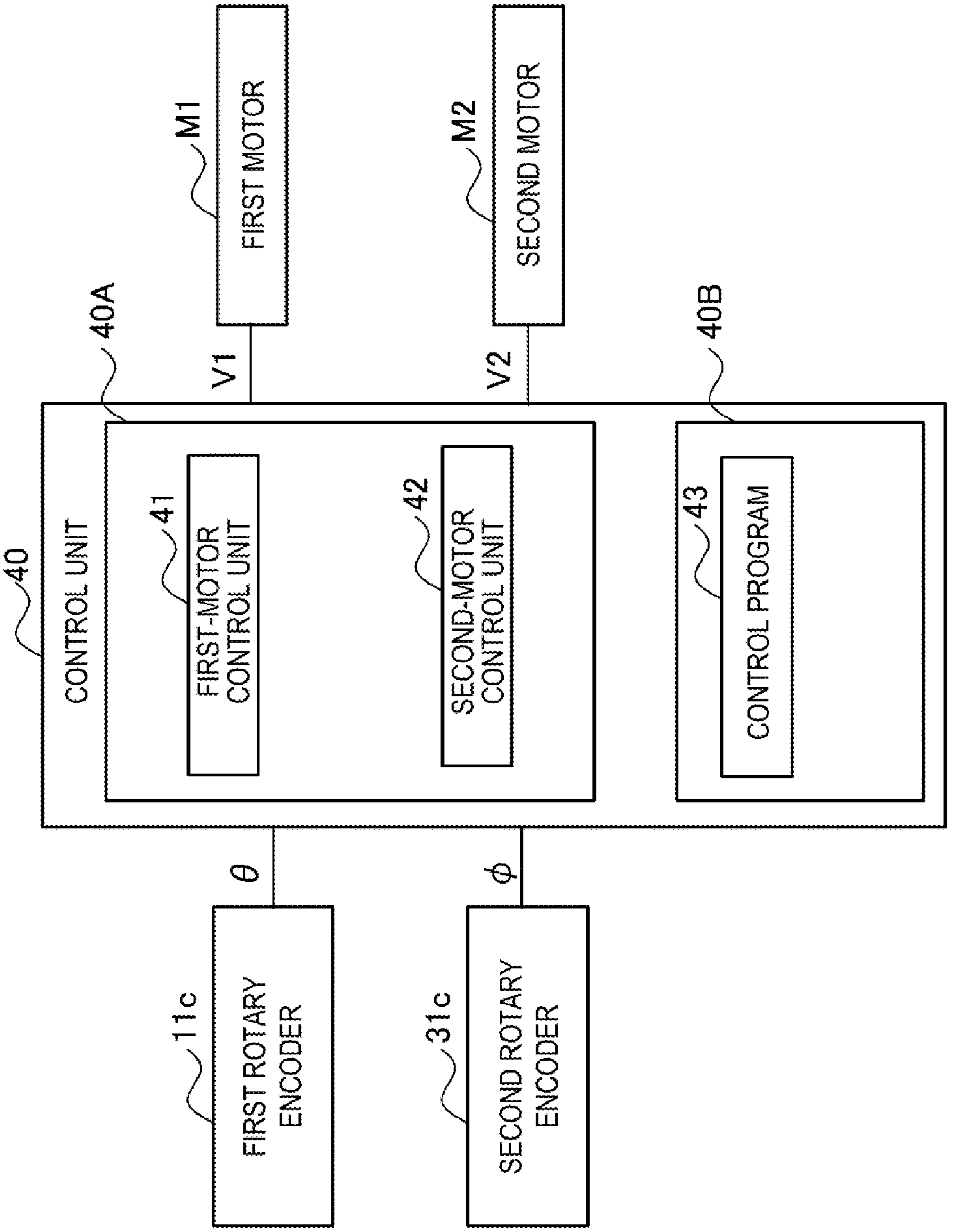
FIG. 3 is a diagram illustrating one example of a configuration of a control unit.

As illustrated in FIG. 3, a rotational angle θ of the first driving roller 11*a* is inputted from the first rotary encoder 11*c* into the control unit 40, and a rotational angle φ of the second driving roller 31*a* is inputted from the second rotary encoder 31*c* into the control unit 40.

The first rotary encoder 11*c* is disposed, for example, at an end portion, in the width direction, of the first driving roller 11*a*, and is configured to detect the rotational angle θ of the first driving roller 11*a*. The first rotary encoder 11*c* outputs a detection signal indicating the rotational angle θ to the control unit 40.

The present embodiment describes a case in which the first rotary encoder 11*c* is disposed at the first driving roller 11*a*. However, the configuration is not limited to this. The first rotary encoder 11*c* may be disposed at the first motor M1 to detect the rotational angle of the driving shaft of the first motor M1.

The second rotary encoder 31*c* is disposed, for example, at an end portion, in the width direction, of the second driving roller 31*a*, and is configured to detect the rotational angle φ of the second driving roller 31*a*. The second rotary encoder 31*c* outputs a detection signal indicating the rotational angle φ to the control unit 40.

The present embodiment describes a case in which the second rotary encoder 31*c* is disposed at the second driving roller 31*a*. However, the configuration is not limited to this. The second rotary encoder 31*c* may be disposed at the second motor M2 to detect the rotational angle of the driving shaft of the second motor M2.

The control unit 40 controls a first voltage V1 applied to the first motor M1. In addition, the control unit 40 controls a second voltage V2 applied to the second motor M2.

Note that the present embodiment describes a case in which the control unit 40 controls the first voltage V1 and the second voltage V2. However, the configuration is not limited to this. The control unit 40 may control the first voltage V1 and the second voltage V2 through a voltage control circuit.

The control unit 40 includes a processor 40A and a memory 40B.

The memory 40B is a storage device configured to store, in a nonvolatile manner, data or a program executed by the processor 40A. The memory 40B is comprised of a magnetic storage device, a semiconductor storage element such as a flash read only memory (ROM), or other types of nonvolatile storage device. In addition, the memory 40B may include a random access memory (RAM) that constitutes the work area of the processor 40A. Furthermore, the memory 40B may include a nonvolatile storage device such as a hard disk drive (HDD), a solid state drive (SSD), or the like.

The memory 40B stores data to be processed by the control unit 40 or a control program 43 to be executed by the processor 40A.

The processor 40A may be configured as a single processor or may be configured such that a plurality of processors function as the processor 40A.

The control unit 40 may be configured, for example, with an integrated circuit. The integrated circuit includes an LSI, an application specific integrated circuit (ASIC), and a programmable logic device (PLD). The PLD includes, for example, a field-programmable gate array (FPGA). In addition, a portion of the configuration of the integrated circuit may include an analog circuit, and it may be possible to employ a combination of a processor and an integrated circuit. The combination of a processor and an integrated circuit is called a micro-controller (MCU), a system-on-a-chip (SoC), a system LSI, a chip set, or the like.

The control unit 40 functionally includes a first-motor control unit 41 and a second-motor control unit 42. Specifically, the processor 40A reads the control program 43 stored in the memory 40B to execute it, thereby functioning as the first-motor control unit 41 and the second-motor control unit 42.

The first-motor control unit 41 adjusts the first voltage V1 applied to the first motor M1 on the basis of information about the transport velocity and the transport acceleration of the label sheet P, such that the load torque TL1 of the first motor M1 is the target torque TS.

The target torque TS corresponds to one example of a "predetermined value".

The information about the transport velocity and the transport acceleration of the label sheet P includes, for example, an angular velocity ω1 and an angular acceleration α1 of rotation at the first roller 11.

The angular velocity ω1 can be expressed as the following Equation (3).

$$\omega 1 = d\theta/dt \tag{3}$$

That is, the angular velocity ω1 can be obtained by differentiating the rotational angle θ with respect to the time t.

The angular acceleration α1 can be expressed as the following Equation (4).

$$\alpha 1 = d^2\theta/dt^2 \tag{4}$$

That is, the angular acceleration α1 can be obtained by differentiating, twice, the rotational angle θ with respect to the time t. In other words, the angular acceleration α1 can be obtained by differentiating the angular velocity ω1 with respect to the time t.

Note that, below, description will be made of a case in which the rotational speed of the first motor M1 and the rotational speed of the first roller 11 are equal to each other, for the purpose of convenience. That is, description will be made of a so-called case in which the speed reduction ratio is "1". In addition, description will be made of a case in which the first motor M1 is a direct current motor.

The following Equation (5) shows a relationship between a first voltage V1($t$) applied to the first motor M1 and a current I1($t$) flowing through the first motor M1.

[Equation 1]

$$V1(t) = R1 \times I1(t) + L1\frac{dI1(t)}{dt} + K1 \times \omega 1 \tag{5}$$

Here, the constant R1 represents a resistance value of the first motor M1. The constant L1 represents an inductance of the first motor M1. The constant K1 represents a torque constant of the first motor M1, that is, a back electromotive force constant.

The period required for the current I1 to reach a stationary value is significantly short as compared with the period required for the angular velocity ω1(=dθ1/dt) to reach a stationary value. Thus, in the present embodiment, it is assumed that the term concerning a change in time of the current I1($t$), that is, the second term at the right-hand side of the Equation (5) is zero. Thus, the following Equation (6) can be obtained.

$$V1(t) = R1 \times I1(t) + K1 \times \omega 1 \tag{6}$$

The generated torque TE1 generated by the first motor M1 can be obtained using the following Equation (7).

$$TE1 = K1 \times I1(t) \tag{7}$$

The equation of motion of the first motor M1 can be expressed in the following Equation (8).

$$TM1 = J1 \times \alpha 1 + C1 \times \omega 1 \tag{8}$$

Here, the load torque TM1 represents a load torque of the first motor M1. The constant J1 represents a moment of inertia of the first motor M1. The constant C1 represents a viscous load of the first motor M1.

The generated torque TE1 generated by the first motor M1 can be obtained through the following Equation (9) by using the load torque TM1 of the first motor M1.

$$TE1 = TM1 + TL1 \tag{9}$$

Here, the load torque TL1 indicates a load torque applied to the first motor M1 from the label sheet P.

By using Equation (6), the current I1($t$) of Equation (7) is removed; Equation (8) and the equation obtained by removing the current I1($t$) from Equation (7) are substituted into Equation (9) to work it out in terms of the first voltage V1($t$), whereby it is possible to obtain the following Equation (10).

[Equation 2]

$$V1(t) = \frac{J1 \times R1}{K1}\alpha 1 + \left(K1 + \frac{c1 \times R1}{K1}\right)\omega 1 + \frac{R1}{K1}TL1 \tag{10}$$

The first-motor control unit 41 adjusts the first voltage V1 applied to the first motor M1 so as to be the first voltage V1 obtained using the Equation (10) such that the load torque TL1 of the first motor M1 is a predetermined value.

In the present embodiment, the first-motor control unit 41 controls the load torque TL1 so as to be equal to the target torque TS that is a constant value. That is, the first-motor control unit 41 adjusts the first voltage V1 applied to the first motor M1 so as to be the first voltage V1 obtained using Equation (10), such that the load torque TL1 is equal to the target torque TS that is a constant value. By controlling the first voltage V1 applied to the first motor M1 in this manner, it is possible to control the tension TP to be equal to the tension target value TT.

In other words, on the basis of the angular velocity ω1 and the angular acceleration α1 of rotation at the first roller 11, the first-motor control unit 41 controls the first voltage V1 applied to the first motor M1 using Equation (10), thereby being able to control the tension TP to be equal to the tension target value TT.

The second-motor control unit 42 performs feedback control of the second voltage V2 applied to the second motor M2 on the basis of information about the rotational angle φ of the second driving roller 31*a* and the transport velocity VP of the base sheet Pa, such that the transport velocity VP of the base sheet Pa is a predetermined velocity. The information about the transport velocity VP of the base sheet Pa is an angular velocity ω2 of rotation of the second roller 31. The relationship between the transport velocity VP of the base sheet Pa and the angular velocity ω2 of rotation of the second roller 31 can be expressed as the following Equation (11).

$$VP=R2\times\omega2 \tag{11}$$

Here, the constant R2 indicates a radius of the second roller 31.

On the other hand, the following Equation (12) can be obtained as with Equation (6) described above.

$$V2(t)=R2\times I2(t)+K2\times\omega2 \tag{12}$$

Here, the constant R2 indicates a resistance value of the second motor M2. The constant K2 indicates a torque constant of the second motor M2, that is, a back electromotive force constant.

In addition, a generated torque TE2 generated by the second motor M2 is expressed as the following Equation (13).

$$TE2=K2\times I2(t) \tag{13}$$

For example, when the generated torque TE2 generated by the second motor M2 is a constant value, the current I1(*t*) flowing through the first motor M1 in Equation (12) is removed by using Equation (13), whereby it is possible to obtain the following Equation (14).

$$V2(t)=R2\times TE2/K2+K2\times\omega2 \tag{14}$$

That is, in order to increase the angular velocity ω2 of rotation of the second roller 31, it is only necessary to increase the second voltage V2 applied to the second motor M2. In addition, in order to reduce the angular velocity ω2 of rotation of the second roller 31, it is only necessary to reduce the second voltage V2 applied to the second motor M2. In other words, it is possible to control the transport velocity VP by using the second voltage V2 as the amount of control.

The second-motor control unit 42 calculates the angular velocity ω2 of the second roller 31 on the basis of the rotational angle φ of the second roller 31, and uses Equation (11) to calculate an actually measured value VQ of the transport velocity VP. Furthermore, calculation is perform to obtain a difference ΔV between the target transport velocity VT corresponding to the rotational angle φ of the second roller 31 and the actually measured value VQ of the transport velocity VP, and feedback control, for example, PID control is performed to the second voltage V2 applied to the second motor M2 as the amount of control such that the difference ΔV is zero.

In this manner, the second-motor control unit 42 controls the transport velocity VP so as to be the target transport velocity VT.

Figure 4:
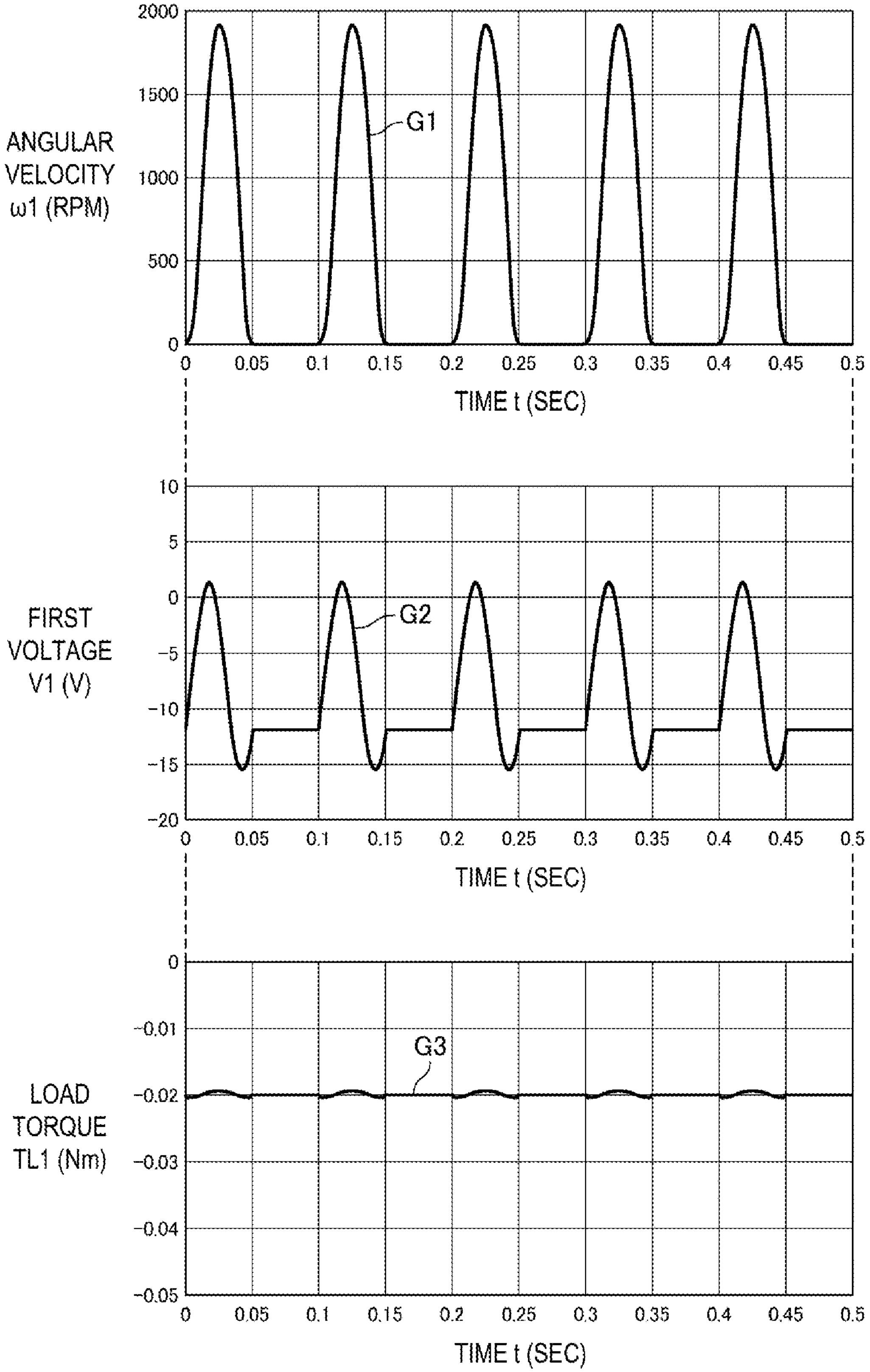
FIG. 4 is graphs each showing one example of a rotational speed, a voltage, and a load torque concerning a first motor.

Next, with reference to FIG. 4, description will be made of a specific example of operation of the first-motor control unit 41. FIG. 4 includes graphs each showing one example of the angular velocity ω1, the first voltage V1, and the load torque TL1 concerning the first motor M1. FIG. 4 shows results of simulation of the angular velocity ω1, the first voltage V1, and the load torque TL1 concerning the first motor M1.

The graph of the angular velocity ω1 is shown in the upper section of FIG. 4. The graph of the first voltage V1 is shown in the middle section of FIG. 4. The graph of the load torque TL1 is shown in the lower section of FIG. 4.

In the graph shown in the upper section of FIG. 4, the vertical axis indicates the angular velocity ω1, and the horizontal axis indicates the time t.

The graph G1 indicates changes in the angular velocity ω1. FIG. 4 illustrates a case in which the angular velocity ω1 changes, for example, in a shape of a waveform obtained by rectifying a current in a form of sine wave into a form of half-wave, as illustrated by the graph G1. For example, as for the angular velocity ω1, during a period of time when the time t is from 0 to 0.025 sec, the angular velocity ω1 increases from 0 to 1900 rpm. Furthermore, the angular velocity ω1 reduces from 1900 rpm to 0 rpm during a period of time when the time t is from 0.025 sec to 0.05 sec. The angular velocity ω1 is kept at 0 during a period of time when the time t is from 0.05 sec to 0.1 sec.

In the graph shown in the middle section of FIG. 4, the vertical axis indicates the first voltage V1, and the horizontal axis indicates the time t. The graph G2 indicates changes in the first voltage V1. Note that the first voltage V1 is controlled by the first-motor control unit 41 on the basis of Equation (10) described above.

As illustrated in the graph G2, the first voltage V1 is kept at −12 V during a period of time in which the angular velocity ω1 is kept at 0, for example, during a period of time when the time t is from 0.05 sec to 0.1 sec. That is, during this period of time, the first motor M1 causes the first roller 11 to be driven in the negative direction. The negative direction represents a direction in which the roll paper R is driven in a direction opposite to the advancing direction.

The first voltage V1 increases from −12 V to 1.22 V during a period of time when the time t is from 0 sec to 0.018 sec. In addition, the first voltage V1 reduces from 1.22 V to −15.53 V during a period of time when the time t is from 0.018 sec to 0.043 sec. In addition, during a period of time when the time t is from 0.043 sec to 0.05 sec, the first voltage V1 increases from −15.53 V to −12 V. That is, when the first motor M1 accelerates, the first voltage V1 increases due to the moment of inertia of the first motor M1 and the viscous load of the first motor M1. When the first motor M1 decelerates, the first voltage V1 reduces due to the moment of inertia of the first motor M1 whereas the first voltage V1 increases due to the viscous load of the first motor M1.

In the graph shown in the lower section of FIG. 4, the vertical axis indicates the load torque TL1, and the horizontal axis indicates the time t.

In the graph G3, the load torque TL1 is kept at a substantially constant value, that is, at −0.02 Nm. A negative value of the load torque TL1 indicates that the first motor M1 receives a load in the advancing direction of the label sheet P due to the tension TP applied to the label sheet P between the first roller 11 and the second roller 31.

As described above with reference to FIG. 4, the first-motor control unit 41 controls the first voltage V1 on the basis of Equation (10) described above, whereby it is possible to keep the load torque TL1 at a substantially constant value even when the angular velocity ω1 of the first motor M1 changes.

Figure 5:
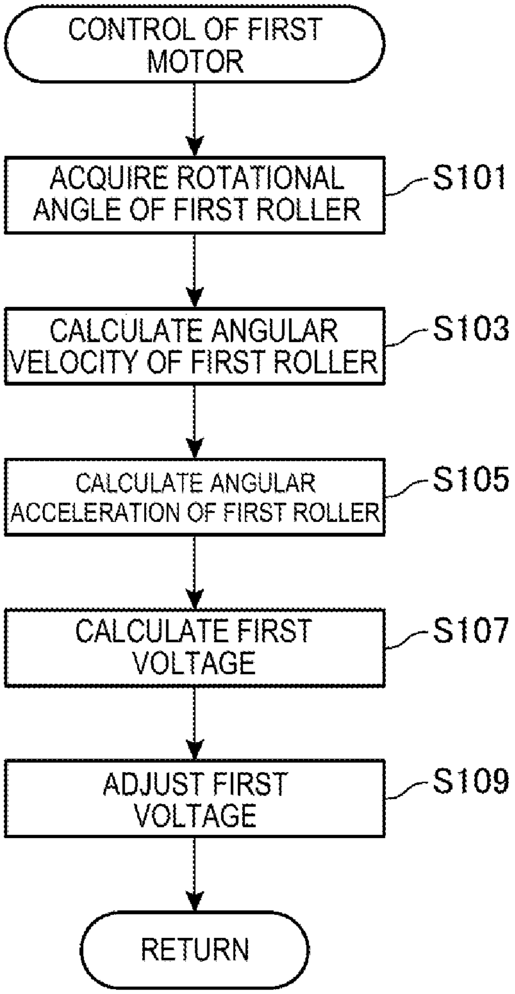
FIG. 5 is a flowchart showing one example of control of the first motor.

Next, processes of the control unit 40 will be described with reference to FIGS. 5 and 6. FIG. 5 is a flowchart showing one example of control of the first motor M1 by the first-motor control unit 41.

Note that FIG. 5 illustrates a case in which the load torque TL1 is set in advance to the target torque TS that is a constant value, such that the tension TP is the tension target value TT.

First, in step S101, the first-motor control unit 41 acquires the rotational angle θ of the first driving roller 11*a* from the first rotary encoder 11*c*, as illustrated in FIG. 5. Next, in step S103, the first-motor control unit 41 calculates the angular velocity ω1 of the first driving roller 11*a* by differentiating the rotational angle θ with respect to the time t.

Next, in step S105, the first-motor control unit 41 calculates the angular acceleration α1 of the first driving roller 11*a* by differentiating the angular velocity ω1 with respect to the time t.

Next, in step S107, the first-motor control unit 41 substitutes the load torque TL1, the angular velocity ω1, and the angular acceleration α1 into Equation (10) described above to calculate the first voltage V1.

Then, in step S109, the first-motor control unit 41 adjusts the first voltage V1 applied to the first motor M1 so as to be the calculated first voltage V1. Then, the process returns to step S101.

Step S107 and step S109 correspond to one example of a "first step".

In this manner, the first-motor control unit 41 adjusts the first voltage V1 applied to the first motor M1 to be the first voltage V1 calculated using Equation (10) described above. This makes it possible to control the tension TP so as to be equal to a tension target value TT1.

Figure 6:
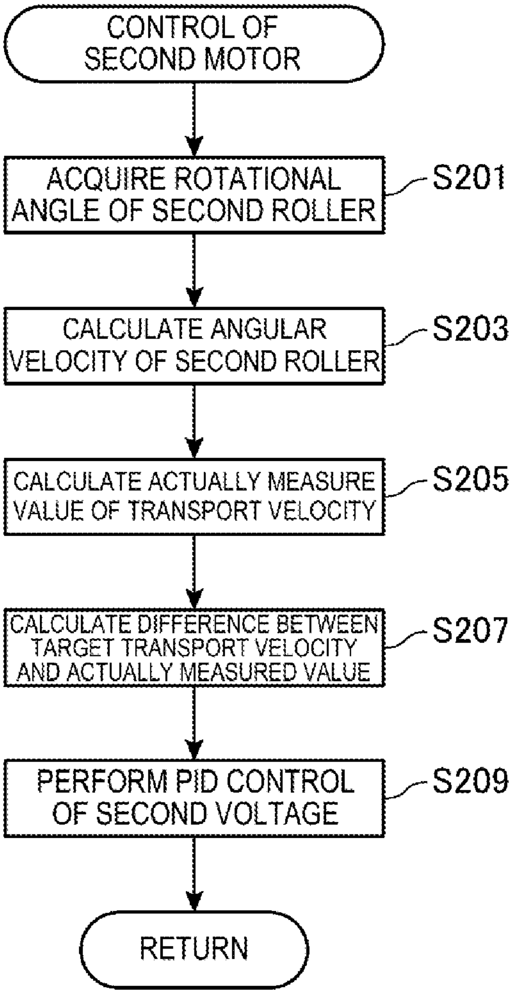
FIG. 6 is a flowchart showing one example of control of a second motor.

FIG. 6 is a flowchart showing one example of control of the second motor M2 by the second-motor control unit 42.

First, in step S201, the second-motor control unit 42 acquires the rotational angle φ of the second driving roller 31*a* from the second rotary encoder 31*c*, as illustrated in FIG. 6. Next, in step S203, the second-motor control unit 42 differentiates the rotational angle φ with respect to time t to calculate the angular velocity ω2 of the second driving roller 31*a*.

Next, in step S205, the second-motor control unit 42 calculates the actually measured value VQ of the transport velocity VP of the base sheet Pa on the basis of the calculated velocity ω2.

After this, in step S207, the second-motor control unit 42 calculates a difference ΔV between the calculated actually measured value VQ of the transport velocity VP and the target transport velocity VT corresponding to the rotational angle φ.

Next, in step S209, the second-motor control unit 42 performs PID control to the second voltage V2 applied to the second motor M2 as the amount of control, such that the difference ΔV is zero. After this, the process returns to step S201.

Step S207 and step S209 correspond to one example of a "second step".

In this manner, the second-motor control unit 42 performs PID control of the second voltage V2 applied to the second motor M2 as the amount of control, such that the difference ΔV between the actually measured value VQ of the transport velocity VP and the target transport velocity VT is zero. This enables the second-motor control unit 42 to control the transport velocity VP so as to be equal to the target transport velocity VT.

As described above with reference to FIGS. 1 to 6, the label printer 1 according to the present embodiment includes: the printing head 8 configured to perform printing on the label sheet P in which the label Pb is attached at the base sheet Pa; the peeling unit 4 configured to peel the label Pb from the base sheet Pa; the first roller 11 disposed upstream of the peeling unit 4 in the transport path of the label sheet P; the second roller 31 disposed downstream of the peeling unit 4 in the transport path of the base sheet Pa; the first motor M1 configured to drive the first roller 11; the second motor M2 configured to drive the second roller 31; and the control unit 40 configured to control the first motor M1 and the second motor M2, in which the control unit 40 includes: the first-motor control unit 41 configured to adjust the first voltage V1 applied to the first motor M1 on the basis of information about the transport velocity VP and the transport acceleration of the label sheet P such that the load torque TL1 of the first motor M1 is the target torque TS; and the second-motor control unit 42 configured to perform feedback control of the second voltage V2 applied to the second motor M2 on the basis of information concerning the transport velocity VP of the base sheet Pa such that the transport velocity VP of the base sheet Pa is the target transport velocity VT.

With this configuration, the first-motor control unit 41 adjusts the first voltage V1 applied to the first motor M1 on the basis of information about the transport velocity VP and the transport acceleration of the label sheet P, such that the load torque TL1 of the first motor M1 is the target torque TS. This makes it possible to control the load torque TL1 of the first motor M1 so as to be the target torque TS. Thus, it is possible to appropriately control the tension TP between the first roller 11 and the second roller 31 so as to be equal to the tension target value TT.

In addition, the second-motor control unit 42 performs feedback control of the second voltage V2 applied to the second motor M2 on the basis of the information about the transport velocity VP of the base sheet Pa, such that the transport velocity VP of the base sheet Pa is the target transport velocity VT. This makes it possible to appropriately control the transport velocity VP of the base sheet Pa so as to be the target transport velocity VT.

In addition, in the label printer 1 according to the present embodiment, the information about the transport velocity VP and the transport acceleration of the label sheet P includes the angular velocity ω1 and the angular acceleration α1 of rotation of the first roller 11.

With this configuration, the first-motor control unit 41 adjusts the first voltage V1 applied to the first motor M1 on the basis of the angular velocity ω1 and the angular acceleration α1 of rotation of the first roller 11. This makes it possible to appropriately control the load torque TL1 of the first motor M1 so as to be the target torque TS.

In addition, the label printer 1 according to the present embodiment, the information about the transport velocity PV of the base sheet Pa includes the angular velocity ω2 of rotation of the second roller 31.

With this configuration, the second-motor control unit 42 performs feedback control of the second voltage V2 applied to the second motor M2 on the basis of the angular velocity ω2 of rotation of the second roller 31. This makes it possible to appropriately control the transport velocity VP of the base sheet Pa so as to be the target transport velocity VT.

In addition, in the label printer 1 according to the present embodiment, the first-motor control unit 41 adjusts the first voltage V1 applied to the first motor M1 using Equation (A), such that the load torque TL1 of the first motor M1 so as to be the target torque TS.

[Equation 3]

$$V1(t) = \frac{J1 \times R1}{K1}\alpha 1 + \left(K1 + \frac{c1 \times R1}{K1}\right)\omega 1 + \frac{R1}{K1}TL1 \quad \text{(A)}$$

Here, the V1(*t*) on the left-hand side represents a voltage applied to the first motor M1. In addition, the α1 on the right-hand side represents an angular acceleration of the first roller 11. The ω1 represents an angular velocity of the first roller 11. The TL1 represents a load torque of the first motor M1.

With this configuration, it is possible to appropriately control the first voltage V1 applied to the first motor M1 such that the load torque TL1 of the first motor M1 is the target torque TS.

In addition, in the label printer 1 according to the present embodiment, the front surface of each of the first roller 11 and the second roller 31 is formed by thermal spraying or subjected to powder coating.

With this configuration, it is possible to suppress occurrence of slip relative to the front surface of the first roller 11 of the label sheet P. In addition, this makes it possible to suppress occurrence of slip relative to the front surface of the second roller 31 of the base sheet Pa.

The method of controlling the label printer 1 according to the present embodiment provides a method of controlling driving control of the label printer 1 including: the printing head 8 configured to perform printing on the label sheet P in which the label Pb is attached at the base sheet Pa; the peeling unit 4 configured to peel the label Pb from the base sheet Pa; the first roller 11 disposed upstream of the peeling unit 4 in a transport path of the label sheet P; the second roller 31 disposed downstream of the peeling unit 4 in a transport path of the base sheet Pa; the first motor M1 configured to drive the first roller 11; the second motor M2 configured to drive the second roller 31; the control unit 40 configured to control the first motor M1 and the second motor M2, the method including: a first step including adjusting, by the control unit 40, the first voltage V1 applied to the first motor M1 on the basis of information about the transport velocity VP and the transport acceleration of the label sheet P, such that the load torque TL1 of the first motor M1 is the target torque TS; and a second step including performing, by the control unit 40, feedback control of the second voltage V2 applied to the second motor M2 on the basis of information about the transport velocity VP of the base sheet Pa, such that the transport velocity VP of the base sheet Pa is the target transport velocity VT.

Thus, the method of controlling a label printer 1 according to the present embodiment provides an effect similar to the label printer 1 according to the present embodiment.

Note that, the present embodiment merely represents one aspect of the present disclosure, and any modification and application may be possible within the scope of the present disclosure.

For example, description has been made of a case in which the first driving unit according to the present embodiment is the first motor M1. However, the configuration is not limited to this. The first driving unit may include a voltage control circuit configured to control the first voltage V1 supplied to the first motor M1.

In addition, for example, description has been made of a case in which the second driving unit according to the present embodiment is the second motor M2. However, the configuration is not limited to this. The second driving unit may include a voltage control circuit configured to control the second voltage V2 supplied to the second motor M2.

The present embodiment describes a case in which the target torque TS is a constant value. However, the target torque TS is not limited to this. For example, it may be possible to employ a mode in which the target torque TS is determined according to the size of the label sheet P.

Furthermore, each functional component illustrated in FIG. 3 shows the functional configuration, and there is no particular limitation as to the specific implementation mode. In other words, it is not necessary to install hardware that individually corresponds to each of the functional component, and it may be possible to employ a configuration in which a single processor executes a program to achieve functions of a plurality of functional units. Furthermore, a portion of the functions achieved by software in the embodiment described above may be achieved by hardware. Alternatively, a portion of the functions achieved by hardware may be achieved by software. In addition, specific individual configurations of individual components of the label printer 1 can be changed as appropriate without departing from the scope of the present disclosure.

In addition, for example, units of processing in the flowcharts in FIGS. 5 and 6 are divided according to main processing details for the purpose of facilitating understanding the process of the control unit 40, and the present disclosure should not be limited by the way of dividing the units of processing or names of units of processing. It may be possible to make further division into more units of processing depending on the processing details. Furthermore, it may be possible to make division such that one processing unit include more processes. In addition, the order of the processes may be changed on an as-necessary basis within an extent in which it does not affect the main point.

Furthermore, the method of controlling a label printer 1 can be achieved by causing the processor 40A included in the control unit 40 to execute the control program 43 stored in the memory 40B. In addition, the control program 43 can be recorded in a recording medium in a computer readable manner.

As for the recording medium, it is possible to use a magnetic or optical recording medium, or a semiconductor memory device. Specifically, the recording medium described above may include a portable or fixed recording medium, such as a flexible disk, a hard disk drive (HDD), a compact disk read only memory (CD-ROM), a digital versatile disk (DVD), a Blu-ray (registered trademark) disc, a magneto-optical disk, a flash memory, or a card-type recording medium.

In addition, the recording medium may be a non-volatile storage device such as a RAM, a ROM, or an HDD that is an internal storage device included in the label printer 1. Furthermore, the functional blocks of the control unit 40 of the label printer 1 can be achieved by causing the control program 43 to be stored in a server device or the like and downloading the control program 43 from the server device to the control unit 40 of the label printer 1.

What is claimed is:

1. A printing apparatus comprising:

a printing head configured to perform printing on a label sheet obtained by attaching a label to a base sheet;

a peeling unit configured to peel the label from the base sheet;

a first roller disposed upstream of the peeling unit in a transport path of the label sheet;

a second roller disposed downstream of the peeling unit in a transport path of the base sheet;

a first driving unit configured to drive the first roller;

a second driving unit configured to drive the second roller; and a control unit configured to control the first driving unit and the second driving unit, wherein the control unit adjusts a voltage applied to the first driving unit on a basis of information about a transport velocity and a transport acceleration of the label sheet, such that a load torque of the first driving unit is a predetermined value, and the control unit performs feedback control of a voltage applied to the second driving unit on a basis of information about a transport velocity of the base sheet, such that the transport velocity of the base sheet is a predetermined velocity.

2. The printing apparatus according to claim 1, wherein the information about the transport velocity and the transport acceleration of the label sheet includes an angular velocity and an angular acceleration of rotation of the first roller.

3. The printing apparatus according to claim 1, wherein the information about the transport velocity of the base sheet includes an angular velocity of rotation of the second roller.

4. The printing apparatus according to claim 1, wherein the control unit adjusts a voltage applied to the first driving unit using Equation (A), such that the load torque of the first driving unit is a predetermined value,

[Equation 3]

$$V1(t) = \frac{J1 \times R1}{K1}\alpha 1 + \left(K1 + \frac{c1 \times R1}{K1}\right)\omega 1 + \frac{R1}{K1}TL1 \quad \text{(A)}$$

where $V1(t)$ on a left-hand side is a voltage applied to the first driving unit, and where $\alpha 1$ on a right-hand side is an angular acceleration of the first roller, $\omega 1$ is an angular velocity of the first roller, and TL1 is a load torque of the first driving unit.

5. The printing apparatus according to claim 1, wherein a front surface of each of the first roller and the second roller is formed by thermal spraying or subjected to powder coating.

6. A method of controlling driving of a printing apparatus including:

a printing head configured to perform printing on a label sheet obtained by attaching a label to a base sheet;

a peeling unit configured to peel the label from the base sheet;

a first roller disposed upstream of the peeling unit in a transport path of the label sheet;

a second roller disposed downstream of the peeling unit in a transport path of the base sheet;

a first driving unit configured to drive the first roller;

a second driving unit configured to drive the second roller; and a control unit configured to control the first driving unit and the second driving unit, the method including:

a first step including adjusting, by the control unit, a voltage applied to the first driving unit on a basis of information about a transport velocity and a transport acceleration of the label sheet, such that a load torque of the first driving unit is a predetermined value; and a second step including performing, by the control unit, feedback control of a voltage applied to the second driving unit on a basis of information about a transport velocity of the base sheet, such that the transport velocity of the base sheet is a predetermined velocity.

* * * * *